United States Patent
Chung

(10) Patent No.: US 11,227,043 B2
(45) Date of Patent: Jan. 18, 2022

(54) ELECTRONIC DEVICE WITH UNLOCKING SYSTEM AND UNLOCKING METHOD

(71) Applicant: Chiun Mai Communication Systems, Inc., New Taipei (TW)

(72) Inventor: Cheng-Yueh Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 107 days.

(21) Appl. No.: 15/993,711

(22) Filed: May 31, 2018

(65) Prior Publication Data

US 2019/0114410 A1 Apr. 18, 2019

(30) Foreign Application Priority Data

Oct. 17, 2017 (CN) .......................... 201710967400.3

(51) Int. Cl.
| | |
|---|---|
| *G06F 21/36* | (2013.01) |
| *G06F 21/45* | (2013.01) |
| *G06F 3/01* | (2006.01) |
| *G06F 7/04* | (2006.01) |
| *G06F 12/00* | (2006.01) |
| *G06F 12/14* | (2006.01) |
| *G06F 13/00* | (2006.01) |

(Continued)

(52) U.S. Cl.
CPC .............. *G06F 21/36* (2013.01); *G06F 3/011* (2013.01); *G06F 3/013* (2013.01); *G06F 3/017* (2013.01); *G06F 21/31* (2013.01); *G06F 21/45* (2013.01)

(58) Field of Classification Search
CPC .......... G06F 21/36; G06F 3/011; G06F 3/013; G06F 3/017; G06F 21/31; G06F 21/45
See application file for complete search history.

(56) References Cited

U.S. PATENT DOCUMENTS 8,819,812 B1 * 8/2014 Weber ..................... G06F 21/31
726/19
8,869,305 B1 * 10/2014 Huang ................. G06F 21/604
726/29

(Continued)

FOREIGN PATENT DOCUMENTS

| CN | 106445111 | 2/2017 |
| CN | 107018121 | 8/2017 |
| CN | 107169338 | 9/2017 |

*Primary Examiner* — Darshan I Dhruv
(74) *Attorney, Agent, or Firm* — ScienBiziP, P.C.

(57) ABSTRACT

A device including an unlocking system includes a sensing device to gather data of a physical movement of a user's body or part as representing an unlocking action. The unlocking system includes a display module, a password setting module, an identifying module, a determining module, and an unlocking module. The display module displays an unlock interface on a display screen which itself can view the user's eyes. The password setting module has a preset unlocking password and the movement can be determined as representing an unlocking action. The correctness of such unlocking action as a password can be determined by the determining module. The unlocking module can unlock all or some functions of the electronic device when the password offered is found correct. Different unlock interfaces can be displayed depending on different geographical locations. An electronic device and a unlocking method are also disclosed.

9 Claims, 16 Drawing Sheets

(51) Int. Cl.
*G11C 7/00* (2006.01)
*G06F 21/31* (2013.01)

(56) References Cited

U.S. PATENT DOCUMENTS

| | | | | |
|---|---|---|---|---|
| 2010/0175116 A1* | 7/2010 | Gum | G06F 21/81 | 726/6 |
| 2012/0313848 A1* | 12/2012 | Galor | G06F 3/005 | 345/156 |
| 2013/0044129 A1* | 2/2013 | Latta | G06F 3/011 | 345/633 |
| 2013/0046544 A1* | 2/2013 | Kay | G06F 16/3322 | 704/275 |
| 2013/0125231 A1* | 5/2013 | Kuenzi | H04W 12/04 | 726/16 |
| 2013/0333020 A1* | 12/2013 | Deshpande | G06F 21/36 | 726/16 |
| 2014/0025957 A1* | 1/2014 | Chen | H04L 9/3226 | 713/184 |
| 2014/0096189 A1* | 4/2014 | Kafka | G06F 21/31 | 726/3 |
| 2014/0125574 A1* | 5/2014 | Scavezze | H04W 12/06 | 345/156 |
| 2014/0126782 A1* | 5/2014 | Takai | G06F 3/04842 | 382/116 |
| 2014/0380465 A1* | 12/2014 | Fadell | H04L 63/0861 | 726/19 |
| 2015/0089449 A1* | 3/2015 | Yeh | G06F 21/36 | 715/825 |
| 2015/0143492 A1* | 5/2015 | Berry | H04L 65/403 | 726/7 |
| 2015/0156803 A1* | 6/2015 | Ballard | G06F 3/04812 | 455/422.1 |
| 2015/0186720 A1* | 7/2015 | Tsou | G06F 21/30 | 348/78 |
| 2015/0347733 A1* | 12/2015 | Tsou | G06F 3/013 | 726/18 |
| 2016/0085076 A1* | 3/2016 | Hoellwarth | H04W 4/80 | 455/566 |
| 2016/0205094 A1* | 7/2016 | Harthattu | H04W 4/02 | 455/411 |
| 2016/0209658 A1* | 7/2016 | Zalewski | G02B 27/0172 | |
| 2016/0210624 A1* | 7/2016 | Niu | G06F 3/021 | |
| 2016/0335802 A1* | 11/2016 | Bradski | A63G 31/16 | |
| 2017/0337737 A1* | 11/2017 | Edwards | F16M 13/04 | |
| 2018/0107816 A1* | 4/2018 | Wu | G06F 21/32 | |
| 2018/0365405 A1* | 12/2018 | Mistry | G06F 21/36 | |
| 2019/0236259 A1* | 8/2019 | Remillet | G06F 21/32 | |
| 2019/0278089 A1* | 9/2019 | Son | G02B 27/017 | |
| 2019/0332758 A1* | 10/2019 | Yin | G06T 11/00 | |
| 2020/0029066 A1* | 1/2020 | Jiao | H04N 21/2187 | |

* cited by examiner

ELECTRONIC DEVICE WITH UNLOCKING SYSTEM AND UNLOCKING METHOD

CROSS-REFERENCE TO RELATED APPLICATIONS

This application claims priority to Chinese Patent Application No. 201710967400.3, filed on Oct. 17, 2017, the contents of which are incorporated by reference herein.

FIELD

The subject matter herein generally relates to electronic devices, especially to an electronic device including an unlocking system.

BACKGROUND

Passwords can be set to lock electronic devices, the password is input to unlock the electronic device. The password may be seen by others when unlocking the device and affect security of the electronic device.

BRIEF DESCRIPTION OF THE DRAWINGS

Implementations of the present technology will now be described, by way of example only, with reference to the attached figures.

DETAILED DESCRIPTION

Figure 1:
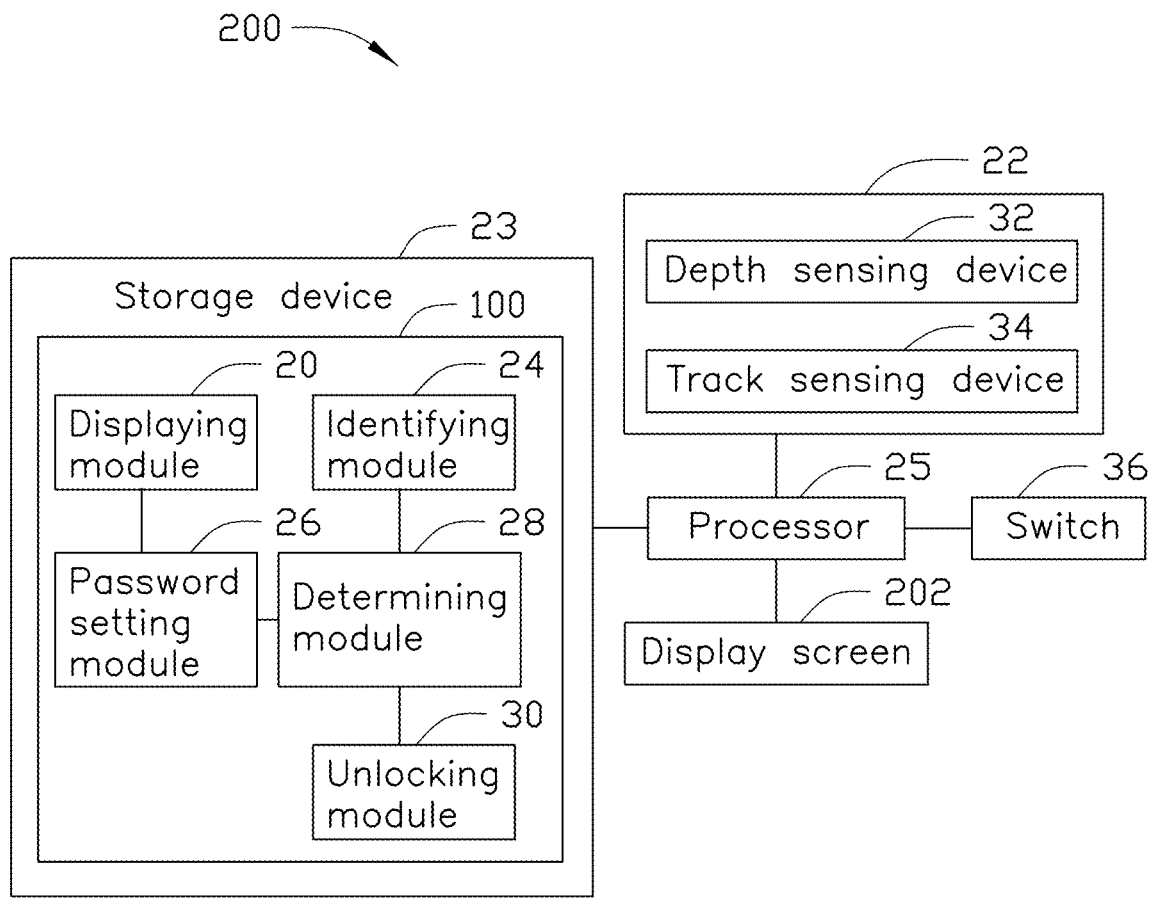
FIG. 1 is a block diagram of an electronic device, according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 2:
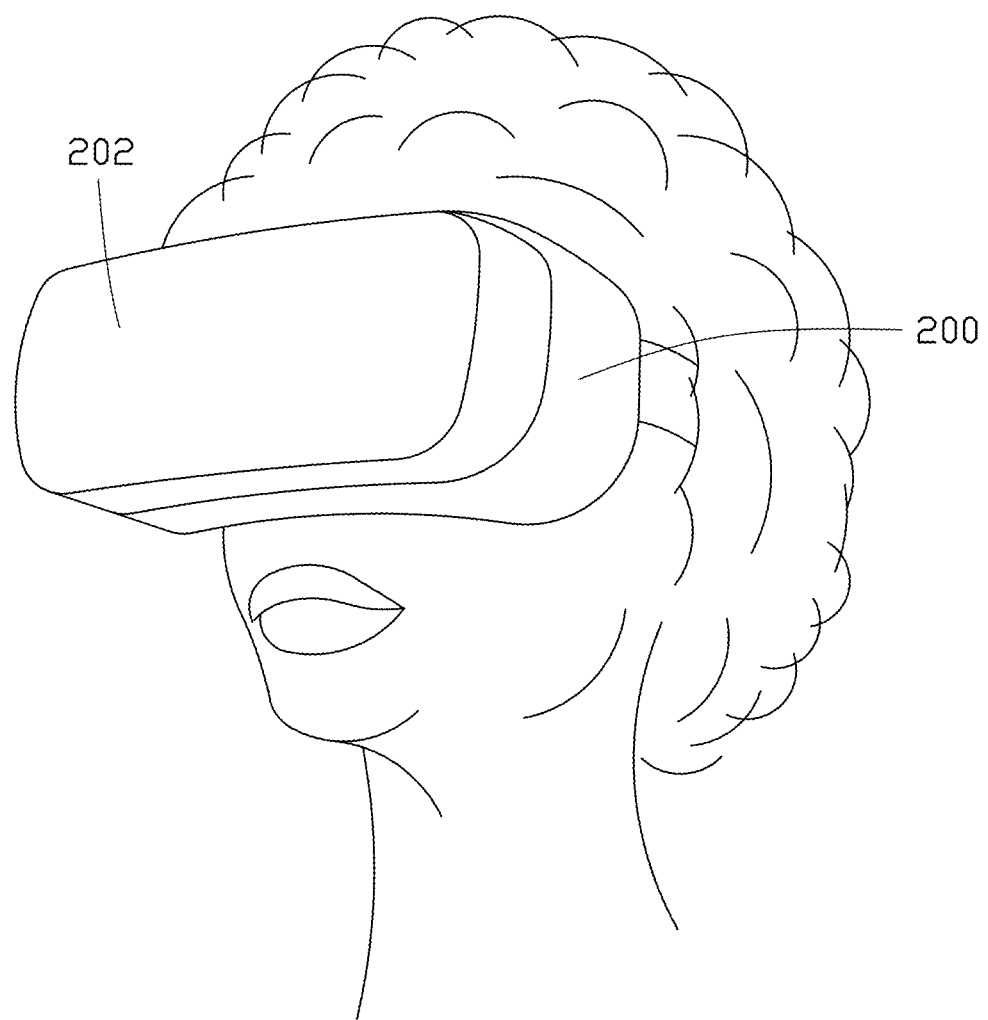
FIG. 2 is a schematic of the electronic device in FIG. 1, according to a first exemplary embodiment.

FIGS. 1 and 2 illustrate an electronic device 200 including a display screen 202, a sensing device 22, a storage device 23, and a processor 25. The storage device 23 stores an unlocking system 100. The unlocking system 100 includes a displaying module 20, an identifying module 24, a password setting module 26, a determining module 28, and an unlocking module 30. The processor 42 is configured to calculate and process various kinds of data of the unlocking system 100. The unlocking system 100 is configured to allow unlocking of the electronic device 200.

Figure 3:
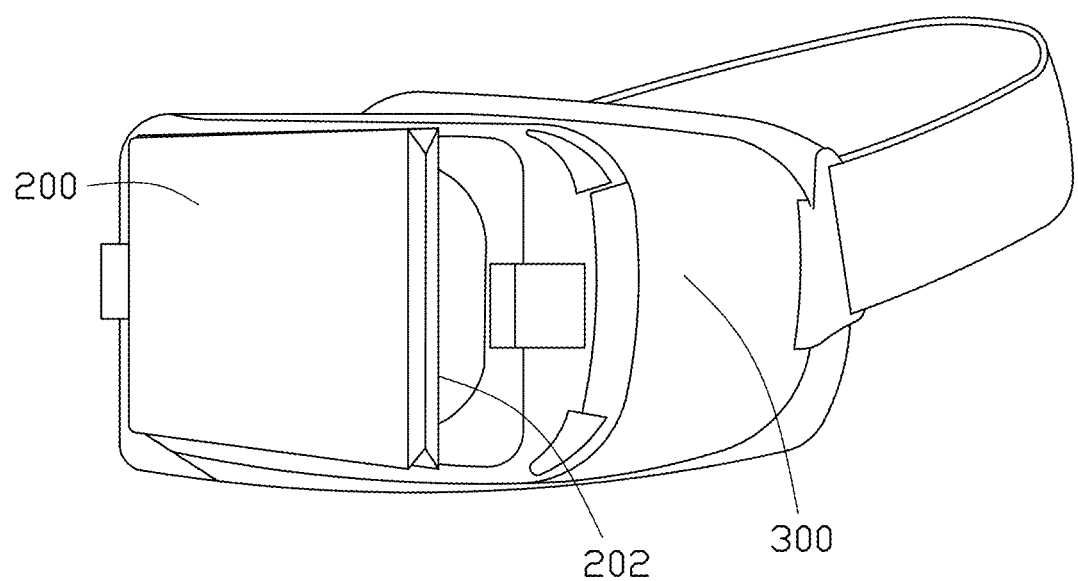
FIG. 3 is a schematic of the electronic device in FIG. 1, according to a second exemplary embodiment.

The displaying module 20 is configured to display an unlock interface on the display screen 202. The display screen 202 is located in an enclosed but viewable environment. The electronic device 200 is a virtual reality device that is wearable on the user's head so that the display screen 202 faces the user's eyes and forms an enclosed environment between the display screen 202 and the user's eyes. Therefore, the display screen 202 cannot be seen by others. FIG. 3 illustrates that, in another embodiment, the electronic device 200 is a portable electronic device, for example, a mobile phone. The electronic device 200 is fixed on a virtual reality device 300. The user wears the virtual reality device 300 on the head and arranges the display screen 202 to be in front of the user's eyes to form the closed environment between the display screen 202 and the user's eyes, so that the display 200 cannot be seen by others.

The sensing device 22 is configured to sense a physical unlocking action of the user. In an embodiment, a user's hand may be moved, the unlocking action being a motion of the hand in a certain trajectory. In another embodiment, the eyes of the user may move, and the unlocking action is fixing the user's gaze on the unlock interface.

The identifying module 24 is configured to identify a movement of the unlocking action relative to the display screen 202 and determine whether or not the physical movement is an unlocking operation. The movement can include a movement relative to the display screen 202, front and back, up and down, and left and right directions. The display unit 20 is further configured to display the unlock interface and the unlock operation. The unlock interface is displayed in virtual reality mode, and the unlocking operation is also displayed in virtual reality mode.

The password setting module 26 is configured to preset an unlocking password. The determining module 28 is configured to determine whether a password presented by the unlocking operation is same as the unlocking password. The unlocking module 30 is configured to unlock a function of the electronic device 200 when the presented password is correct. The unlocking of the electronic device 200 puts the electronic device 200 in an operable state, or unlocks an application program in the electronic device 200, or allows reading/storing of data in the electronic device 200.

The sensing device 22 includes a depth sensing device 32 and a track sensing device 34. The depth sensing device 32 is configured to sense a vertical distance between a body part of a user and the display screen 202, that is, to sense forward-backward movements of the body part relative to the display screen 202. The track sensing device 34 is configured to sense a position of the body part on a plane parallel to the display screen 202 at the vertical distance, that is, to sense up-down movements and left-right movements of the body part relative to the display screen 202.

The sensing device 22 can be a camera. The depth sensing device 32 can be a depth component of the camera, and the track sensing device 34 can be an image acquisition component of the camera. The electronic device 200 further includes a switch 36. The switch 36 is configured to control the sensing device 22 to turn on or turn off. When the sensing device 22 is turned on, an unlocking action of the user's body part is sensed. When the sensing device 22 is turned off, the motion of a body part cannot be sensed. The switch 36 can be a button positioned on the electronic device 200. In another embodiment, the electronic device 200 is a portable electronic device. The portable electronic device is detachably fixed on a virtual reality device. The virtual reality device includes a magnet. The switch 36 includes a Hall sensor disposed on the electronic device 200. When the electronic device 200 is fixed on the virtual reality device, the Hall sensor senses the magnet and switch 36 turns on the sensing device 22.

Figure 4:
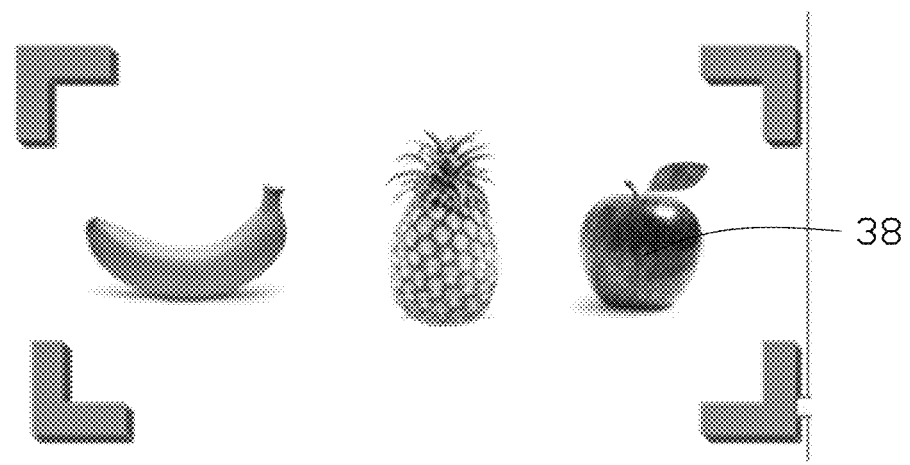
FIG. 4 is diagram of an unlock interface of the electronic device, being a one-dimensional interface.

FIG. 4 illustrates the unlock interface shows a number of first objects 38 such as apple, pineapple, and banana, on a same vertical axis. People can preset the unlocking password as a banana or an apple or a pineapple or an arrangement or combination of banana, apple and pineapple, through the password setting module 26. When the determining module 28 determines that the presented password is correct, the unlocking module 30 unlocks the electronic device 200.

Figure 5:
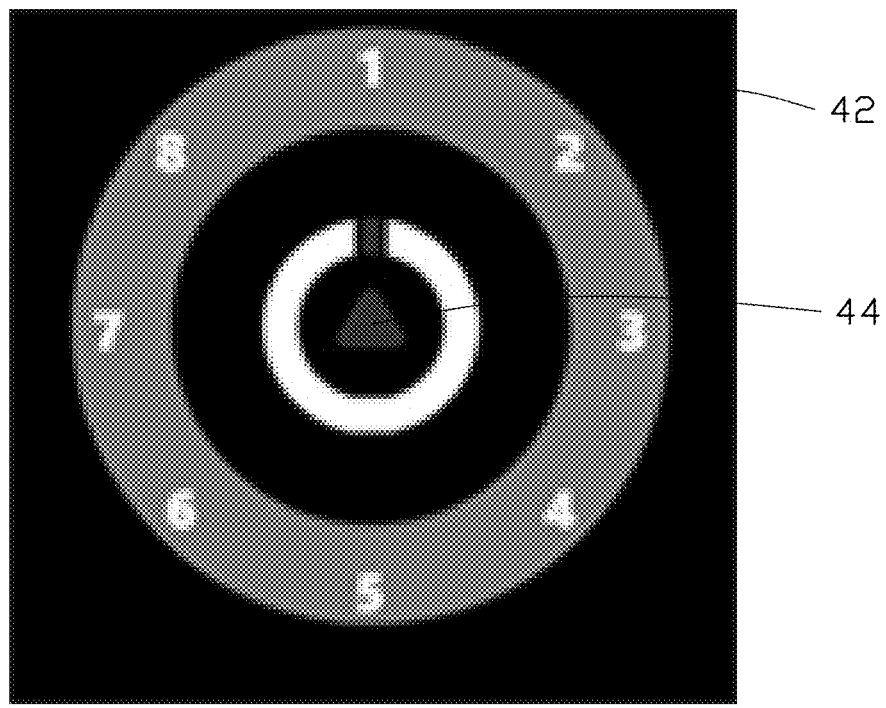
FIG. 5 is diagram of an unlock interface of the electronic device, being a two-dimensional interface.

FIG. 5 illustrates the unlock interface as including a rotatable digital ring 42 and an indicator pin 44. The unlocking password is a digital arrangement. When the unlocking operation rotates the digital ring 42 and a rotation order of digitals is same as the digital arrangement, the unlocking module 30 unlocks the function of the electronic device 200.

Figure 6:
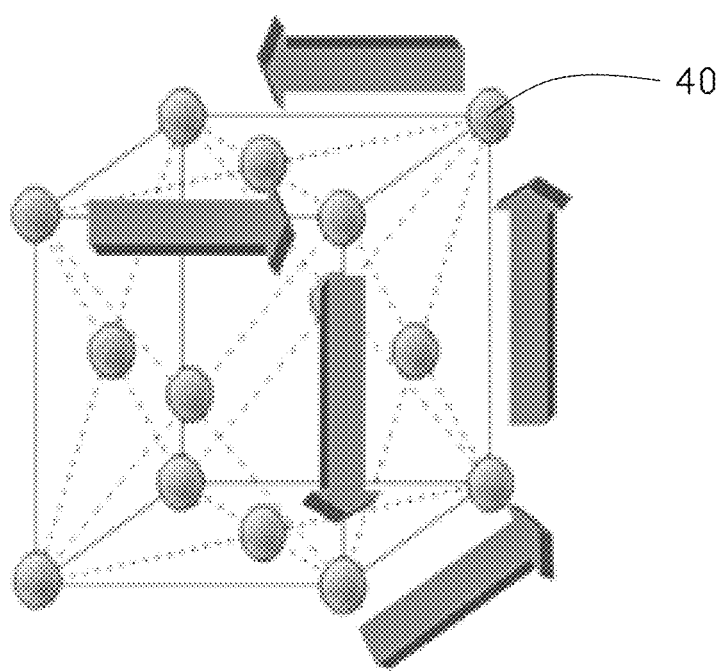
FIG. 6 is diagram of an unlock interface of the electronic device, being a three-dimensional interface.

FIG. 6 illustrates the unlock interface as including a number of points 40 in a three-dimensional space. The unlocking password is at least two points 40 connected in a predetermined order. When the unlocking operation is connecting the at least two points 40 in the predetermined order, the unlocking module 30 unlocks the function of the electronic device 200.

Figure 7:
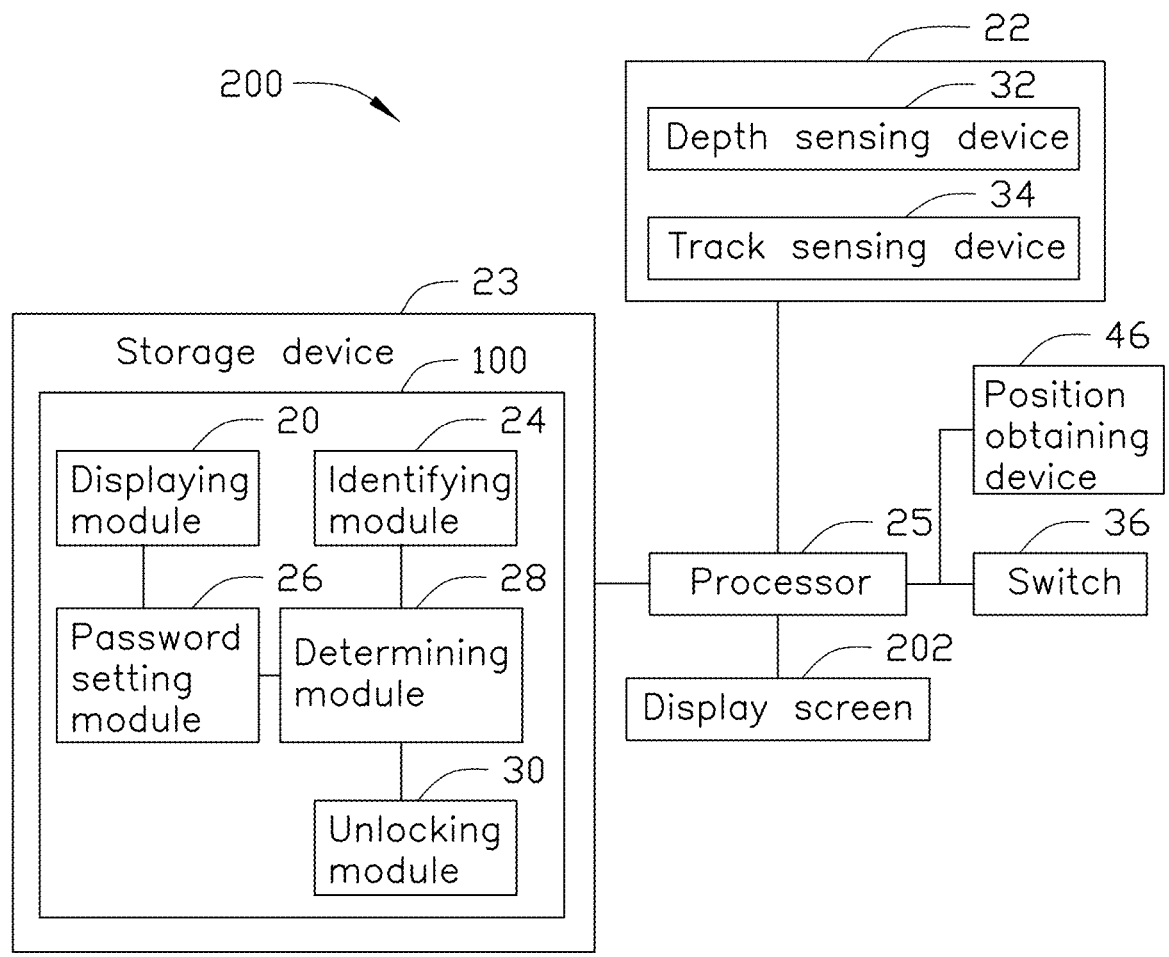
FIG. 7 is a block diagram of an electronic device, according to a second exemplary embodiment.

FIG. 7 illustrates that in another embodiment, the electronic device 200 further includes a position obtaining device 46. The position obtaining device 46 is configured to obtain a position of the electronic device 200. The location of the electronic device 200 can be obtained by a such as a GPS or a base station nearby or a server connected to the electronic device 200. The password setting module 26 can preset different unlock screens and/or different unlocking passwords according to different geographical positions of the electronic device 200. The determining module 28 determines whether the password presented by the unlocking operation is consistent with the preset unlocking password and in addition corresponds to the obtained position of the electronic device 200. The password setting module 26 can preset different unlock screens and/or different unlocking passwords according to different positions of the electronic device 200. The determining module 28 determines whether the password presented by the unlocking operation is consistent with the preset unlocking password corresponding to the obtained position of the electronic device 200. The unlocking unit 30 unlocks the function of the electronic device 200 when the presented password is correct and in accordance with the obtained position of the electronic device 200.

In an embodiment, the geographical position includes office, public area, and home. The password setting module 26 can set different things in a same unlock interface as the elements for an unlocking password corresponding to different positions. For example, FIG. 4 is the unlock interface. The unlocking password corresponding to office, public area, and home are apple, banana, and pineapple. When the electronic device 200 is positioned at the office and apple is selected as the password corresponding to the unlocking operation, the function of the electronic device 200 is unlocked. When the electronic device 200 is positioned at the public area and banana is selected as the password corresponding to the unlocking operation, the function of the electronic device 200 is unlocked. When the electronic device 200 is positioned at home and pineapple is selected as the password corresponding to the unlocking operation, the function of the electronic device 200 is unlocked.

In another embodiment, the password setting module 26 can set different unlock interfaces and different unlocking passwords corresponding to different positions of the electronic device 200. For example, when the position is the office, the unlock interface can be set to be the three-dimensional space shown in FIG. 6 and the unlocking password is set to predetermined order of points 40. When the position is the public area, the unlock interface can be set to the two-dimensional interface shown in FIG. 5 and the unlocking password is set to predetermined order of digitals. When the position is at home, the unlock interface can be set to be the one-dimensional interface in FIG. 4 and the unlocking password is set to be one or more of the fruits.

Figure 8:
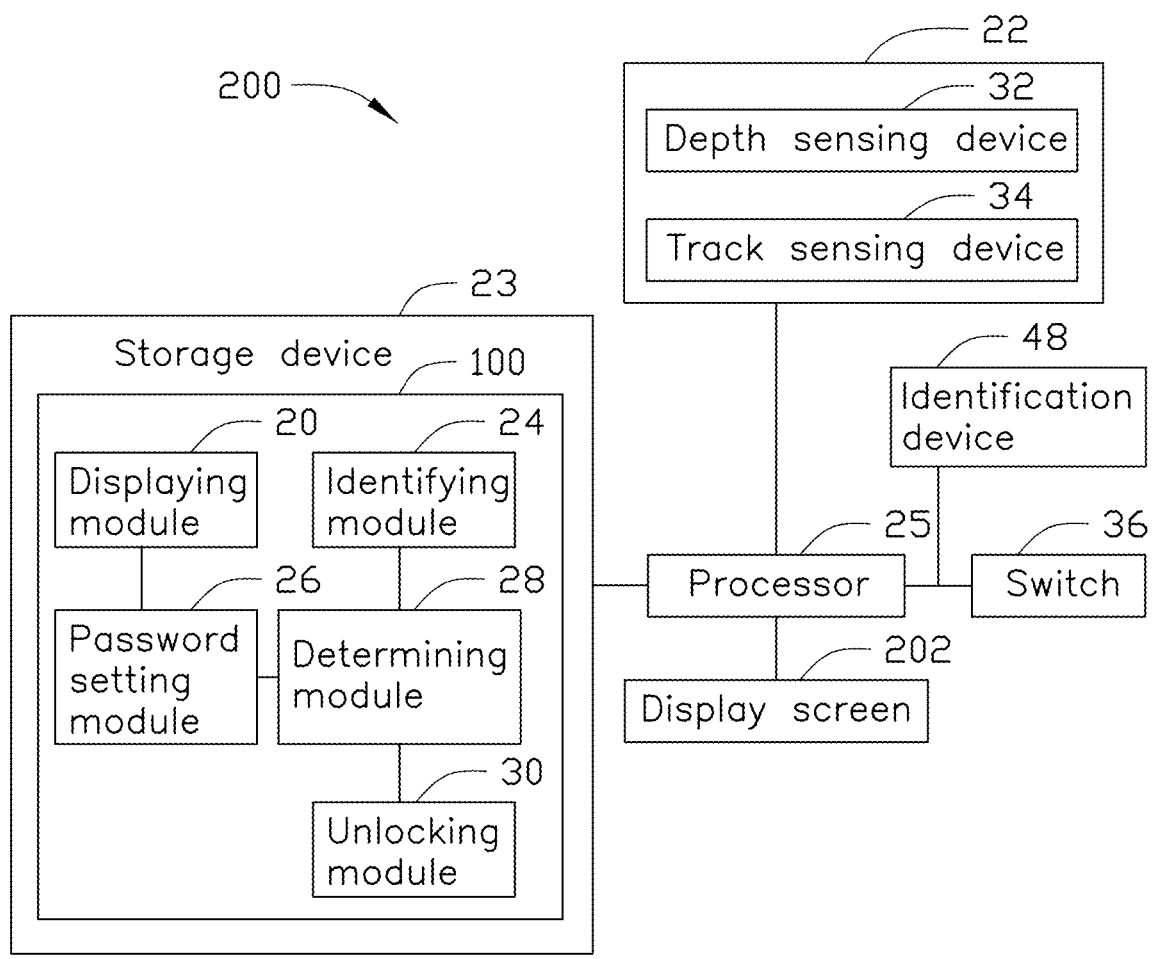
FIG. 8 is a block diagram of an electronic device, according to a third exemplary embodiment.

FIG. 8 illustrates that in another embodiment, the electronic device 200 further includes an identification device 48. The identification device 48 is configured to identify an identity of the user using biological features of the user such as voice prints, fingerprints or retina patterns. The password setting unit 26 can preset different unlocking passwords in a same unlock interface corresponding to different users, or can preset different unlock interfaces and different unlocking passwords according to different users. The determining module 28 is configured to determine whether the password corresponding to the unlocking operation is same as the preset unlocking password corresponding to the identified user. When the password corresponding to the unlocking operation is same as the preset unlocking password corresponding to the identified user, the unlocking module 30 unlocks the function of the electronic device 200.

Figure 9:
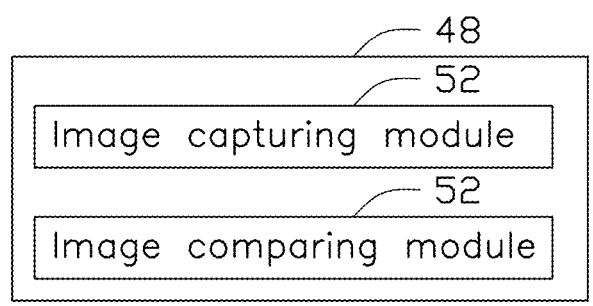
FIG. 9 is a block diagram of an identifying module of the device in FIG. 8, according to a first exemplary embodiment.

FIG. 9 illustrates that the identification device 48 includes an image capturing module 50 and an image comparing module 52. The identification device 48 identifies the user by identifying the user's biometric characteristics. The biometric includes an iris or fingerprint. The image capturing module 50 captures an iris (or fingerprint) image of the user. The image comparing module 52 compares the iris (or fingerprint) image with pre-stored images of irises (or fingerprints) of different users to identify the user.

Figure 10:
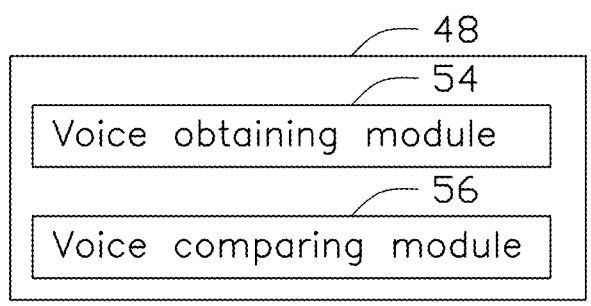
FIG. 10 is a block diagram of the identifying module of the device in FIG. 8, according to a second exemplary embodiment.

FIG. 10 illustrates that the identification device 48 includes a voice obtaining module 54 and a voice comparing module 56. The biometrics include voice of user. The voice obtaining module 54 is configured to obtain voice of the user. The voice comprising module 56 compares the voice of the user with preset voices of one or more users to identify the user.

Figure 11:
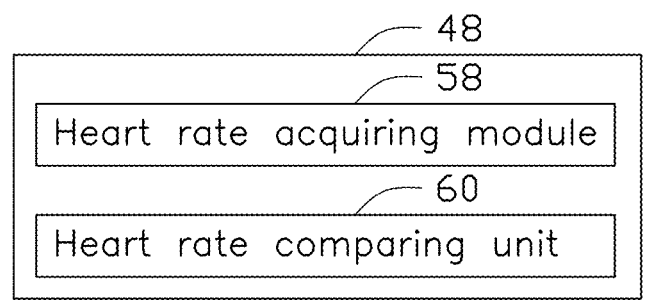
FIG. 11 is a block diagram of the identifying module of the device in FIG. 8, according to a third exemplary embodiment.

FIG. 11 illustrates that the identification device 48 includes a heart rate acquiring module 58 and a heart rate comparing unit 60. The biometrics include heartbeat of a user. The heartbeat acquiring module 58 is configured to obtain waveform of the user's heartbeat. The heart rate comparing module 60 compares the heart rate waveform with preset heart rate features of one or more users to identify the user.

Figure 12:
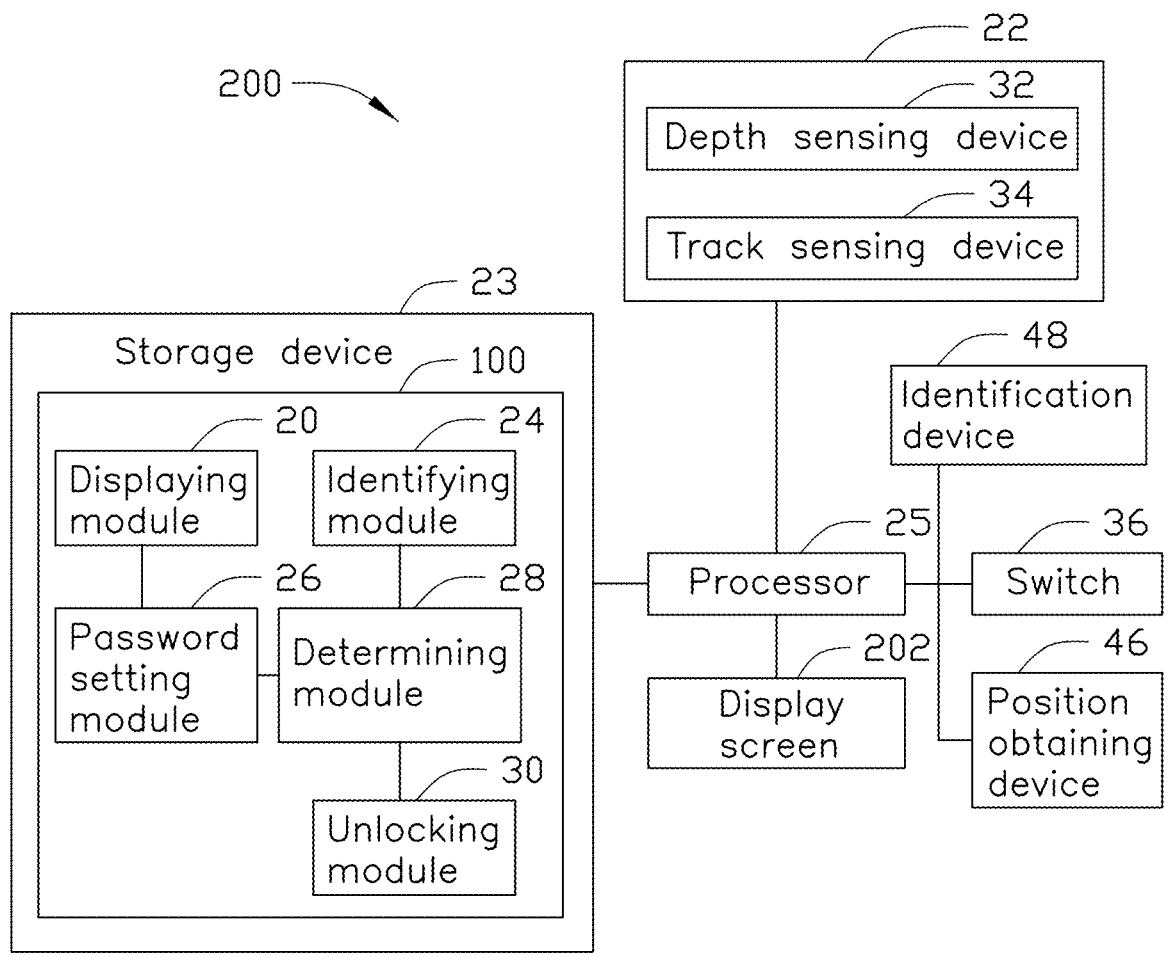
FIG. 12 is a block diagram of an electronic device, according to a fourth exemplary embodiment.

FIG. 12 illustrates that in another embodiment, the electronic device 200 includes both the position obtaining device 46 and the identification device 48. The password setting unit 26 can preset different unlocking passwords in a same unlock interface corresponding to different users and different positions, or preset different unlock interfaces and different unlocking passwords corresponding to different users and different positions. The determining module 28 is configured to determine whether the password presented as the unlocking operation is same as the unlocking password corresponding to the user and the position of the electronic device 200. When the password corresponding to the unlocking operation is same as the unlocking password corresponding to the user and the position of the electronic device 200, the unlocking module 30 unlocks the function of the electronic device 200.

Figure 13:
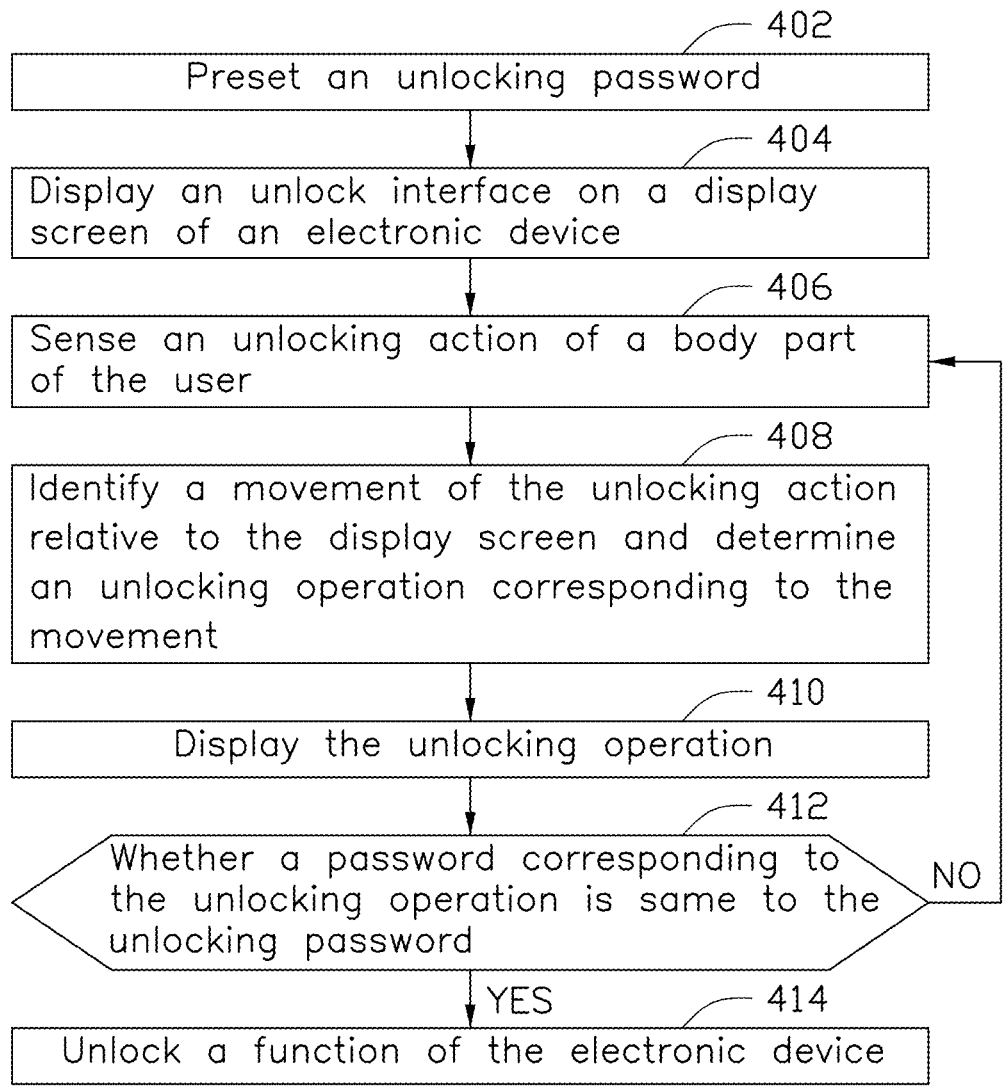
FIG. 13 is a flowchart of an unlocking method, according to a first exemplary embodiment.

FIG. 13 illustrates a flowchart of unlocking method of an electronic device. The example method is provided by way of example, as there are a variety of ways to carry out the method. Each block shown in FIG. 13 represents one or more processes, methods, or subroutines, carried out in the exemplary method. Additionally, the illustrated order of blocks is by example only and the order of the blocks can be changed according to the present disclosure. The exemplary method can begin at block 402. Depending on the embodiment, additional steps can be added, others removed, and the ordering of the steps can be changed.

At block 402, the password setting module 26 presets an unlocking password.

At block 404, the displaying module 20 displays an unlock interface on a display screen 202 of an electronic device 200. The display screen 202 is located in an enclosed environment for being opposite to the user's eyes.

At block 406, the sensing device 22 senses an unlocking action of a body part of the user. In an embodiment, the body part may be a hand, and the unlocking action is a motion trajectory of the hand. In another embodiment, the body part is eyes, and the unlocking action is a position on the unlocked interface that the eye gazes. In another embodiment, the unlocking action includes a movement of the body part relative to the display screen 202 in front and back, up and down, and left and right directions.

At block 408, the identifying module 24 identifies a movement of the unlocking action relative to the display screen 202 and determines an unlocking operation corresponding to the movement.

At block 410, the display unit 20 displays the unlocking operation.

At block 412, the determining module 28 determines whether a password corresponding to the unlocking operation is same to the unlocking password. If the password corresponding to the unlocking operation is same to the unlocking password, the procedure goes to block 414. Otherwise the procedure goes to block 406.

At block 414, the unlocking module 30 unlocks a function of the electronic device 200. The function of the electronic device 200 can be to unlock the electronic device 200 to make the electronic device 200 in an operable state, or to unlock an application program in the electronic device 200, or to allow reading/storing of some data in the electronic device 200.

Figure 14:
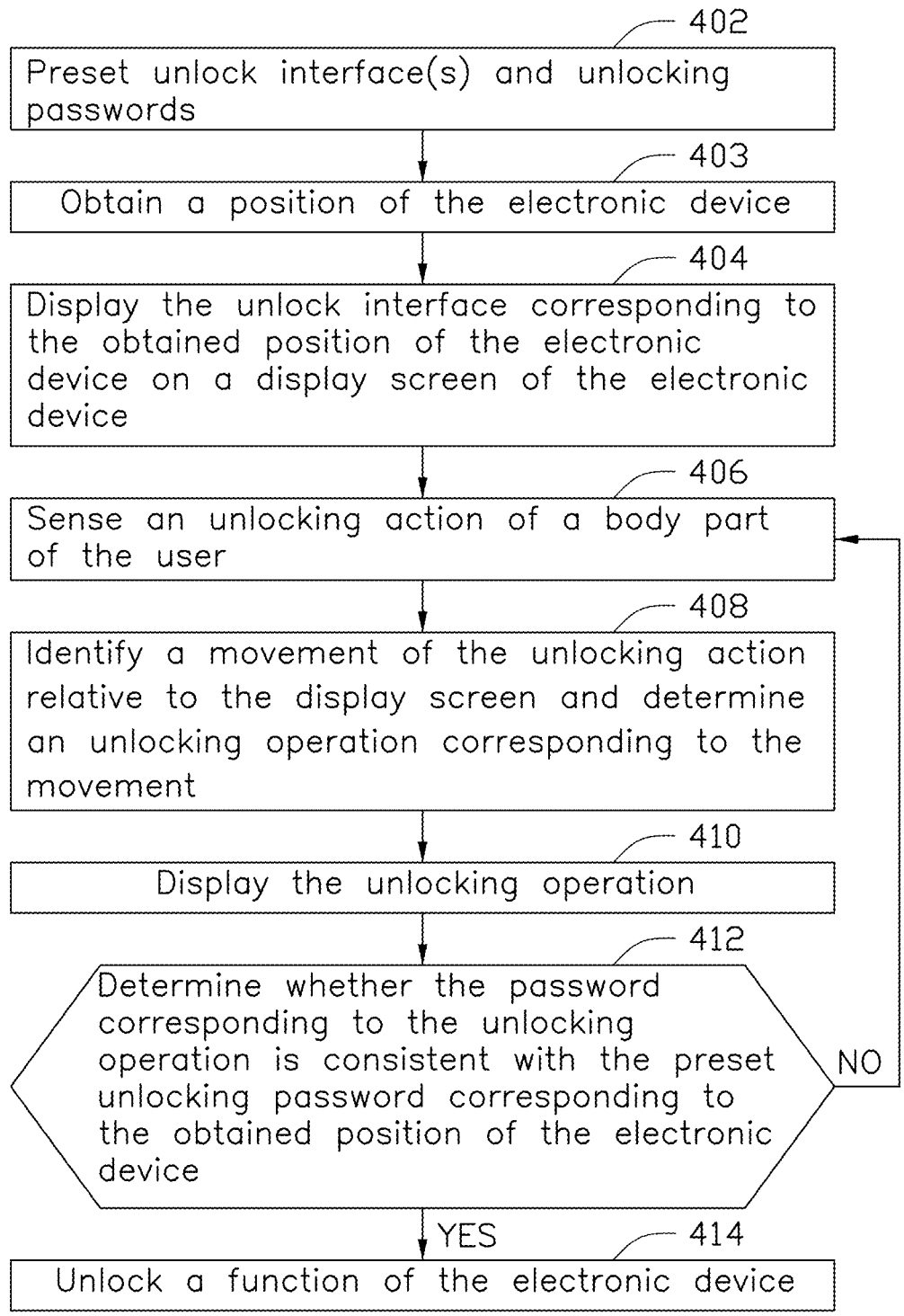
FIG. 14 is a flowchart of an unlocking method, according to a second exemplary embodiment.

FIG. 14 illustrates in another embodiment, the method further includes block 403.

The block 402 is to preset a same unlock interface and different unlocking passwords corresponding to different positions of the electronic device 200 or preset different unlock interfaces and different unlocking passwords corresponding to different positions of the electronic device 200.

At block 403, the position obtaining device 46 obtains a position of the electronic device 200.

At block 404, the displaying module 20 displays the unlock interface corresponding to the obtained position of the electronic device 200 on a display screen 202 of the electronic device 200. The display screen 202 is located in an enclosed environment for being opposite to the user's eyes.

The block 412 is to determine whether the password corresponding to the unlocking operation is consistent with the preset unlocking password corresponding to the obtained position of the electronic device 200. If the password corresponding to the unlocking operation is consistent with the preset unlocking password corresponding to the obtained position of the electronic device 200, the procedure goes to block 414. Otherwise the procedure goes to block 406. Other procedures in FIG. 14 are same to the procedures in FIG. 13.

Figure 15:
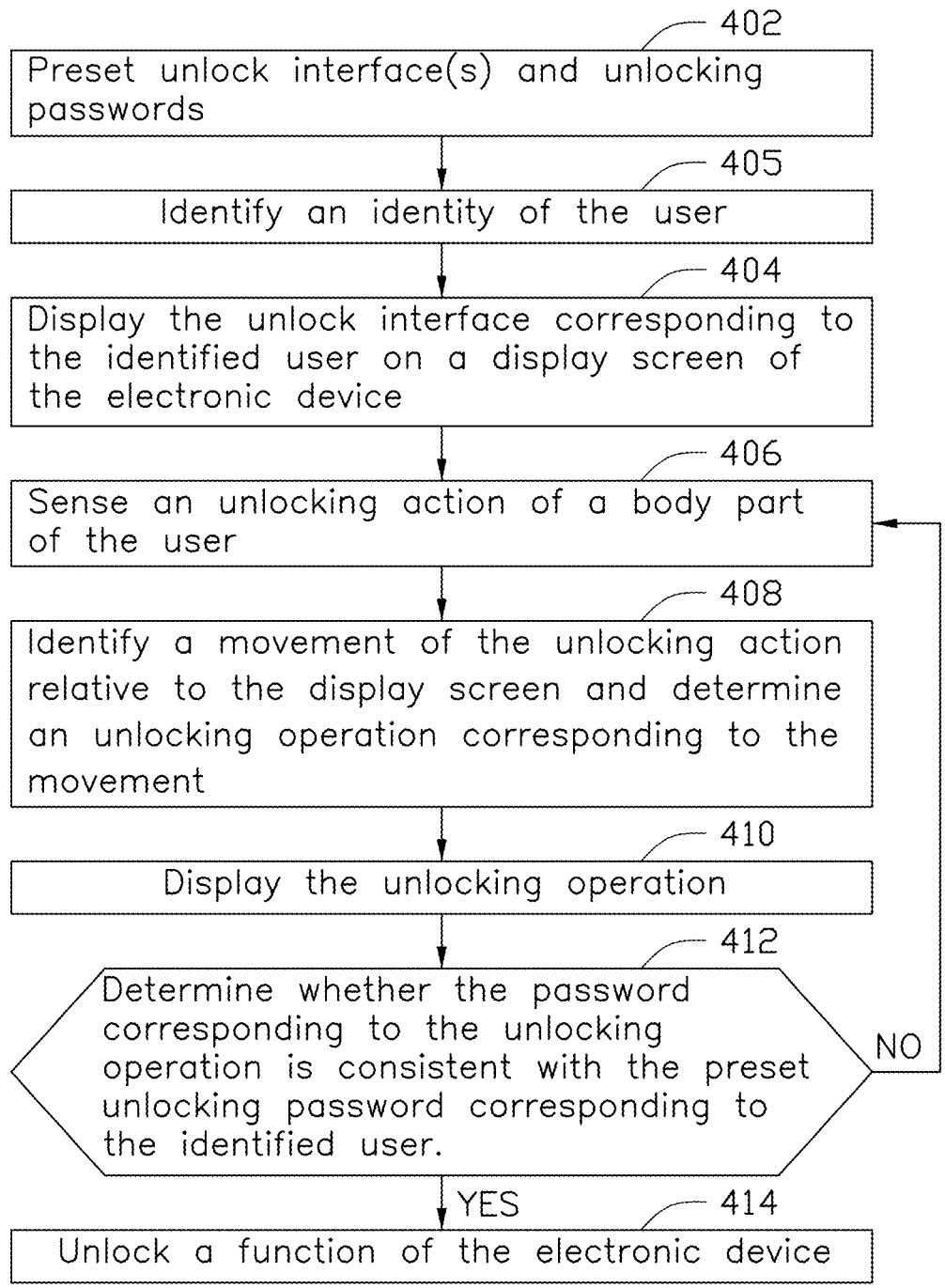
FIG. 15 is a flowchart of an unlocking method, according to a third exemplary embodiment.

FIG. 15 illustrates in another embodiment, the method further includes block 405.

The block 402 is to preset a same unlock interface and different unlocking passwords corresponding to different users or preset different unlock interfaces and different unlocking passwords corresponding to different users.

At block 405, the identification device 48 identifies an identity of the user.

At block 404, the displaying module 20 displays the unlock interface corresponding to the identified user on a display screen 202 of the electronic device 200. The display screen 202 is located in an enclosed environment for being opposite to the user's eyes.

The block 412 is to determine whether the password corresponding to the unlocking operation is consistent with the preset unlocking password corresponding to the identified user. If the password corresponding to the unlocking operation is consistent with the preset unlocking password corresponding to the identified user, the procedure goes to block 414. Otherwise the procedure goes to block 406. Other procedures in FIG. 15 are same to the procedures in FIG. 13.

Figure 16:
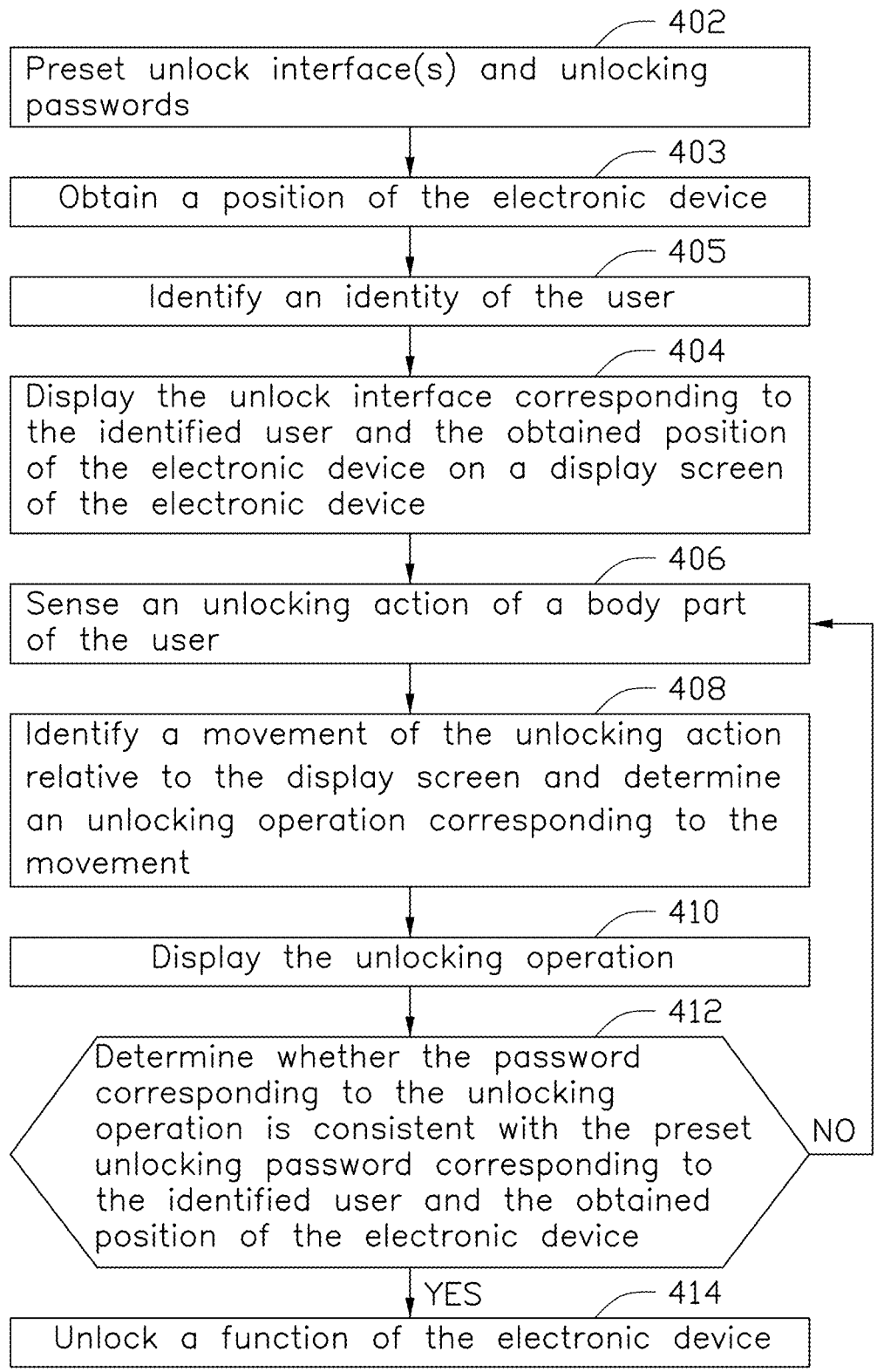
FIG. 16 is a flowchart of an unlocking method, according to a fourth exemplary embodiment.

FIG. 16 illustrates in another embodiment, the method further includes above blocks 403 and 405.

The block 402 is to preset a same unlock interface and different unlocking passwords corresponding to different users and different positions of the electronic device 200 or preset different unlock interfaces and different unlocking passwords corresponding to different users and different positions of the electronic device 200.

At block 404, the displaying module 20 displays the unlock interface corresponding to the identified user and the obtained position of the electronic device 200 on a display screen 202 of the electronic device 200. The display screen 202 is located in an enclosed environment for being opposite to the user's eyes.

The block 412 is to determine whether the password corresponding to the unlocking operation is consistent with the preset unlocking password corresponding to the identified user and the obtained position of the electronic device 200. If the password corresponding to the unlocking operation is consistent with the preset unlocking password corresponding to the identified user and the obtained position of the electronic device 200, the procedure goes to block 414. Otherwise the procedure goes to block 406. Other procedures in FIG. 16 are same to the procedures in FIG. 13.

The exemplary embodiments shown and described above are only examples. Even though numerous dataistics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. An electronic device which is portable and configured to be detachably fixed on a virtual reality device, the electronic device comprising:
   at least one processor;
   a display screen located in an enclosed environment;
   a camera electrically connected to the at least one processor and configured to sense an unlocking action;
   a switch;
   a storage device that stores one or more programs;
   wherein the one or more programs, when executed by the at least one processor, cause the at least one processor to:
   display an unlock interface on the display screen;
   identify a movement of the unlocking action relative to the display screen and determine an unlocking operation corresponding to the movement;
   wherein when the electronic device is fixed on the virtual reality device, the switch automatically changes the camera from being turned off to being turned on to sense the unlocking action;
   the electronic device further comprising an identification device and a position obtaining device, wherein the identification device is electrically connected to the at least one processor and configured to identify a user, the position obtaining device is electrically connected to the at least one processor and configured to obtain a position of the electronic device, and the at least one processor is further caused to:
   preset an unlocking password corresponding to each user and each position of the electronic device;
   determine whether a password corresponding to the unlocking operation is same as the preset unlocking password of the identified user and the obtained position of the electronic device; and
   unlock a function of the electronic device when the password corresponding to the unlocking operation is same as the preset unlocking password of the identified user and the obtained position of the electronic device.

2. The electronic device as claimed in claim 1, wherein the camera is further configured to sense a hand, and the unlocking action is a motion trajectory of the hand.

3. The electronic device as claimed in claim 1, wherein the camera is further configured to sense eyes, and the unlocking action is a position on the unlock interface that the eye gazes.

4. The electronic device as claimed in claim 1, wherein the unlock interface is a one-dimensional interface, two-dimensional interface or three-dimensional interface.

5. The electronic device as claimed in claim 1, wherein the camera comprises a depth component and an image acquisition component, the depth component senses forward-backward movements relative to the display screen, the image acquisition component senses up-down movements and left-right movements relative to the display screen.

6. An unlocking method comprising:
   displaying an unlock interface on a display screen of an electronic device, wherein the electronic device comprises a switch and a camera, when the electronic device is detachably fixed on a virtual reality device, the switch automatically changes the camera from being turned off to being turned on and the display screen is detected to be in an enclosed environment for being opposite to a user's eyes;
   determining whether the camera is turned on;
   sensing an unlocking action by the camera when the camera is turned on;
   identifying a movement of the unlocking action relative to the display screen and an unlocking operation corresponding to the movement;
   identifying an identity of the user using biological features of the user;
   obtaining a position of the electronic device;
   presetting different unlocking passwords corresponding to different users and different positions of the electronic device;
   determining whether a password corresponding to the unlocking operation is same as the preset unlocking password corresponding to the identified user and the obtained position of the electronic device; and
   unlocking a function of the electronic device when the password corresponding to the unlocking operation is same as the preset unlocking password corresponding to the identified user and the obtained position of the electronic device.

7. The unlocking method as claimed in claim 6, wherein further comprising identifying eyes, and recognizing a position on the unlock interface that the eye gazes.

8. The unlocking method as claimed in claim 6, wherein a method of displaying the unlock interface comprises displaying a one-dimensional interface, two-dimensional interface or three-dimensional interface.

9. An unlocking system stored in a storage device of an electronic device and executed by at least one processor of the electronic device, the electronic device comprising a camera and a switch, wherein the camera is electrically connected to the at least one processor and configured to sense an unlocking action of a body part of a user, the switch is configured to automatically change the camera from being turned off state to being turned on state when the electronic device is detachably fixed on a virtual reality device, wherein when the unlocking system is executed by the at least one processor, the at least one processor is caused to:
- display an unlock interface on a display screen of the electronic device, wherein the electronic device is detachably fixed on the virtual reality device to locate the display screen in an enclosed environment opposite to the user's eyes;
- sense the unlocking action of the body part of the user by the camera when the electronic device is fixed on the virtual reality device;
- identify a movement of the unlocking action relative to the display screen and determine an unlocking operation corresponding to the movement;
- preset different unlocking passwords corresponding to different users and different positions of the electronic device;
- determine whether a password corresponding to the unlocking operation is same as the preset unlocking password corresponding to the user and the position of the electronic device;
- unlock a function of the electronic device when the password corresponding to the unlocking operation is same as the preset unlocking password corresponding to the user and the position of the electronic device.

* * * * *